Figure 1:
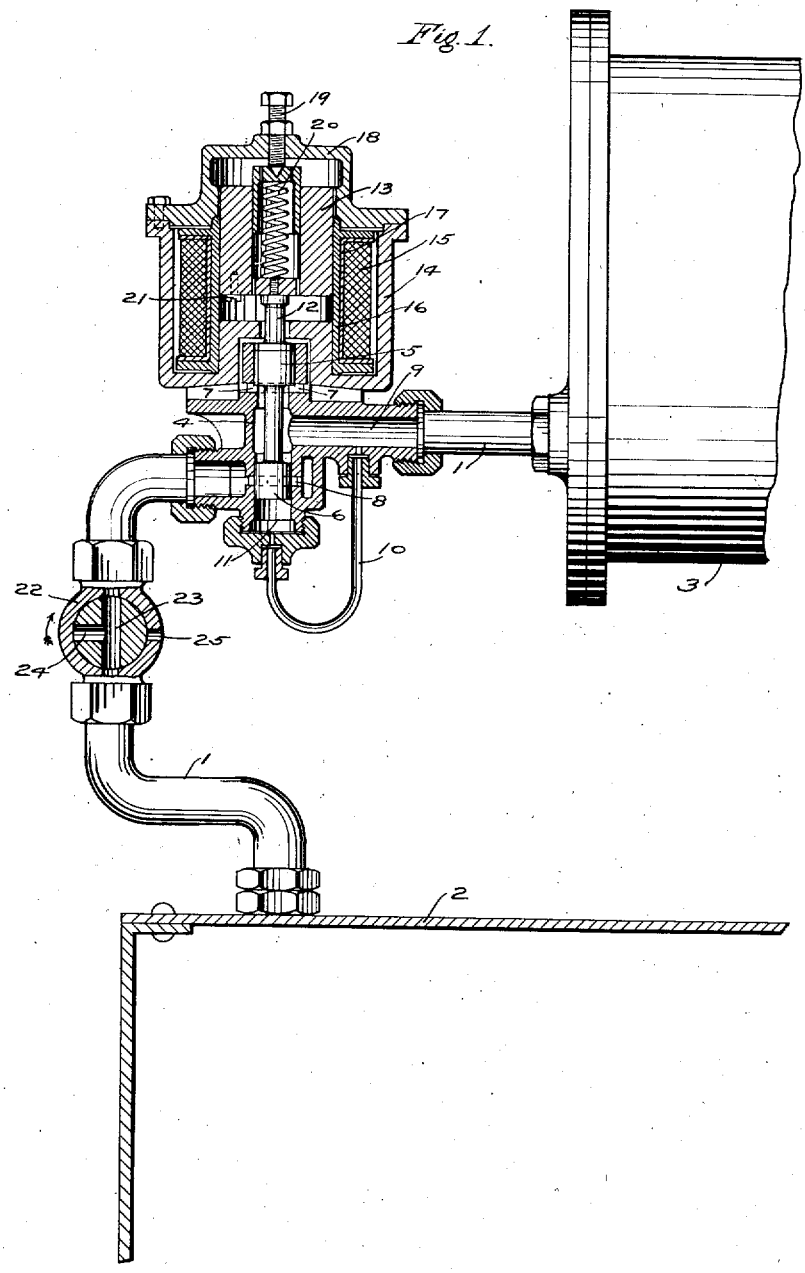

No. 12,710. REISSUED OCT. 29, 1907.

E. KRAMER.

AIR PRESSURE BRAKE.

APPLICATION FILED JULY 1, 1907.

3 SHEETS—SHEET 1

WITNESSES

J. L. Custer

Wm. M. Cady

INVENTOR

Erwin Kramer by E. A. Knight Att'y.

No. 12,710. REISSUED OCT. 29, 1907.

E. KRAMER.

AIR PRESSURE BRAKE.

APPLICATION FILED JULY 1, 1907.

3 SHEETS—SHEET 2.

WITNESSES

J. S. Cutler

Wm. M. Cady

INVENTOR

Erwin Kramer by E. A. Wright

Att'y.

No. 12,710. REISSUED OCT. 29, 1907.
E. KRAMER.
AIR PRESSURE BRAKE.
APPLICATION FILED JULY 1, 1907.
3 SHEETS—SHEET 3.
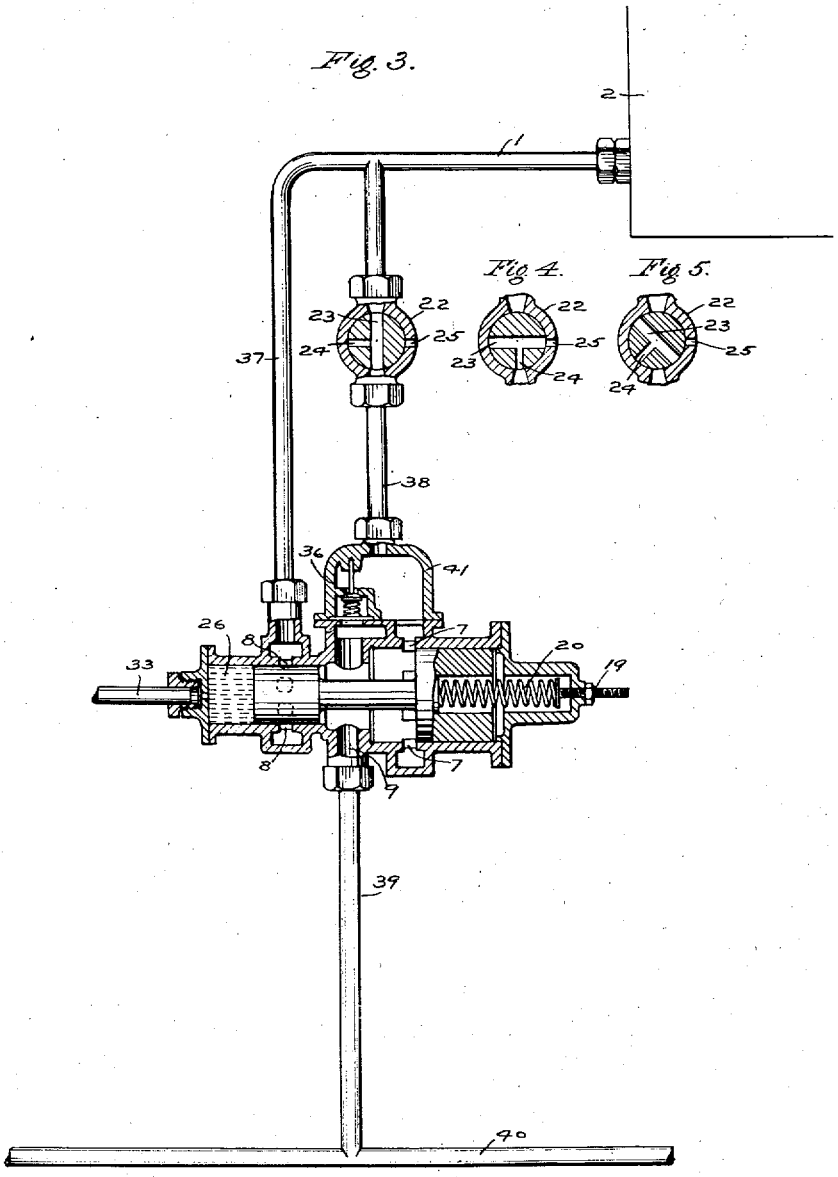
WITNESSES
J. S. Custer
Wm. M. Kady
INVENTOR
Erwin Kramer
by E. H. Wright Att'y.

UNITED STATES PATENT OFFICE.

ERWIN KRAMER, OF BERLIN, GERMANY, ASSIGNOR TO THE WESTINGHOUSE AIR BRAKE COMPANY, OF PITTSBURG, PENNSYLVANIA, A CORPORATION OF PENNSYLVANIA.

AIR-PRESSURE BRAKE.

No. 12,710. Specification of Reissued Letters Patent. Reissued Oct. 29, 1907.

Original No. 828,939, dated August 21, 1906, Serial No. 219,402. Application for reissue filed July 1, 1907. Serial No. 382,127.

*To all whom it may concern:*

Be it known that I, ERWIN KRAMER, a subject of the King of Prussia, German Emperor, residing at No. 9 Paul street, Berlin, Germany, have invented certain new and useful Improvements in Air-Pressure Brakes, of which the following is a specification.

My invention relates to fluid pressure brakes.

One of the objects of my invention is to provide a fluid pressure brake in which the pressure exerted by the brake-blocks above a certain speed depends on the rotative velocity of the wheels. This automatic effect is attained in such way that the valve device which charges or discharges the compressed air into or out of the brake-cylinder, or a main valve which controls the main brake-pipe continuous throughout the train, is regulated by a device which acts on the valve with a varying force, tending to displace the same in accordance with the velocity of rotation of the wheel-axle. In connection with this force two additional forces, one of which is produced by the compressed air in the brake-cylinder and the other by a spring, act in the same or opposite directions and displace the piston or movable slide of the valve if one of the said forces increases or decreases in amount, till equilibrium is restored, thereby altering the pressure in the brake-cylinder accordingly, so that at all times the brake-blocks are set with such a force as is necessary for producing the maximum of braking effect, which can be practically obtained.

Another object of my invention is to provide means for controlling any such regulating valve device according to the speed of the vehicle, or the velocity of rotation of the axle, said means comprising a dynamo, or electric generator, driven from the axle by the momentum of the vehicle, and an electro-magnetic device, such as a solenoid or magnet, connected in circuit with said generator and acting on the regulating valve, whereby the effect of the electro-magnetic device will vary in accordance with the electric current from said generator, which is driven at a rate corresponding to the speed of rotation of the axle.

This feature of my improvement is adapted to be employed in connection with any suitable or preferred form of valve device for regulating the brake-cylinder pressure.

In the accompanying drawings, which form a part of this specification, I have illustrated a mechanism by which I may attain these effects.

Figure 2:
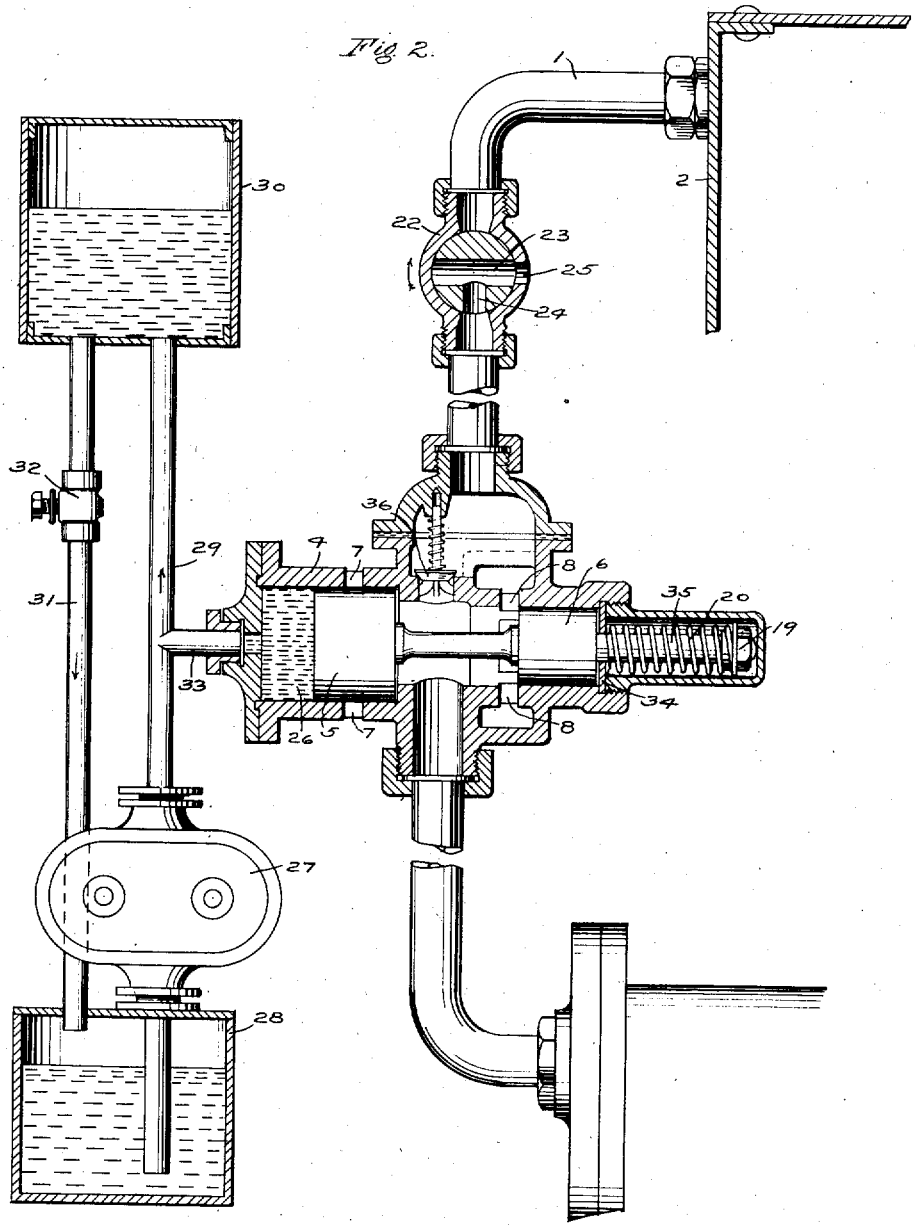

Figure 1 represents a vertical sectional view of one form of my improved valve device with a solenoid and the connections of the device with a reservoir and a brake-cylinder; Fig. 2 is a longitudinal sectional view of another form of valve device adapted to be operated by fluid pressure; Fig. 3 is a longitudinal sectional view of another modification; Figs. 4 and 5 are cross-sections showing, in different positions, a three-way cock, which may be used as a brake valve.

In the braking apparatus represented by Fig. 1, which is principally intended for use in electric street-railways or the like, the brake-cylinder 3 may be supplied from a reservoir 2 in any convenient manner, as by means of a brake valve 22.

The improved valve device 4, inserted into the pipe 1, running from the reservoir 2 to the brake-cylinder 3, is connected with a suitable electro-magnet which controls the valve. As shown in the drawings, the valve device 4 is of the piston type, having a double piston which is vertically movable in the casing. By the movement of the upper piston 5 the exhaust-ports 7 are opened and closed, through which latter the compressed air can be discharged from the brake-cylinder to the atmosphere, while the lower piston 6 controls the inlet ports 8, through which the air is admitted from the reservoir 2 into the valve device, 4 passing from thence into the brake-cylinder 3 through a branch 9. The ports 7 cannot be opened by the piston 5 before the ports 8 are closed by the piston 6, and vice versa.

A by-pass 10 allows the pressure to pass from the sleeve 9 into a chamber 11 at the lower end of the valve, so that the pressure bearing on the lower side of the piston 6 is equal to that in the brake-cylinder.

A rod 12 may connect the upper end of the double piston 5, 6 with the iron core 13 of an electro-magnet or solenoid, to the iron casing 14 of which the valve device 4 may be attached. The coil 15 is wound on a bobbin 16 in the customary manner and insulated therefrom by a layer 17 of suitable material. The iron cover 18, closing the casing 14, surrounds the upper end of the core 13 at a short distance. However, if the core is drawn deeper into the coil the cross-section of the path of the lines of force from the cover to the core will be reduced, in consequence of which the core takes and maintains a definite position for every intensity of the energizing-current. Instead of this arrangement other electromagnets producing the same effect may be used.

In a concentric cavity of the core 13 a spring 20 is arranged which can be adjusted by a set screw 19, which spring tends to press the double piston 5, 6 downward. A screw 21 permits of regulating the deepest position of the core 13.

The driver's brake-cock 22 may be arranged in the pipe 1 at any convenient place, and has the usual passage 23, which allows the air to pass from the reservoir 2 to the brake-cylinder 3, as shown in Fig. 1, and a lateral branch 24. On turning the cock ninety degrees in the direction of the arrow the air can escape from the brake-cylinder 3, through the valve 4, ports 8, passages 24, 23, and a perforation 25 in the body of the hree-way cock 22 to the atmosphere, after the double piston has been lifted above the ports 7, exhausting some pressure, so that the piston reaches its deepest position below the ports 8.

The operation of the apparatus is as follows: If the brake is not applied, the spring 20 forces the double piston 5, 6 into its deepest position, thereby closing the ports 7 and opening the ports 8. When the driver wishes to apply the brake, he brings the brake-cock 22 into the position shown in Fig. 1, connecting at the same time the two terminals of the car-electromotor with the terminals of the winding 15 of the solenoid by means of the switch controller. The compressed air then passes from the reservoir 2, through the ports 8, sleeve 9, and pipe 1, into the brake-cylinder 3, thereby setting the brake-blocks, while the same pressure is communicated to the chamber 11 through the by-pass 10. The pressure in the chamber 11 then lifts the double piston 5, 6 with a certain force tending to shut off the inlet-ports 8 This force is balanced by the force of the spring 20 and by the magnetic force of the solenoid working on the core 13, which two forces act in the opposite direction to the pressure. The said magnetic force depends on the speed of rotation of the wheel-axle, as with a greater speed of rotation a higher intensity of current is produced in the car-motors, which constitute generators in the described connection, than with a lower speed of rotation. Thus at a given velocity an equilibrium is produced between the different forces as soon as the double piston is displaced to the corresponding position, whereby the pressure in the brake-cylinder is regulated to the respective amount. If with a decreasing velocity of the car the magnetic force of the solenoid diminishes, the pressure in the chamber 11 will predominate and push the double piston upward until the ports 7 are opened and part of the compressed air is exhausted from the brake-cylinder, whereupon the double piston is again forced downward by the spring 20 in consequence of the reduced pressure in the brake-cylinder and in the chamber 11. Thus the valve device regulates the pressure of the brake-blocks on the wheels automatically. Owing to the explained automatic effect of the device, the wheels cannot happen to be held fast or locked, so as to be prevented from rotation, as with the beginning skidding of the wheels, the rotative speed of the same and the magnetic force of the solenoid decrease, in consequence of which the valve device is actuated, as above stated, and caused to discharge air from the brake-cylinder, thus relieving the brake-blocks from pressure until the wheels have resumed their original rotative speed. If, on the contrary, on an incline or for any other reason the car increases in velocity, the intensity of current generated in the motors also rapidly increases, giving the solenoid a greater magnetic force, which attracts the core to a deeper position, whereby the inlet-ports 8 are opened, so that additional pressure may be admitted to the brake-cylinder, and set the brake-blocks with a greater force, as will be easily understood.

While I have described a particular form of valve device for regulating both the admission of air under pressure to the brake-cylinder, and also its discharge therefrom for reducing the pressure therein in accordance with the decrease in speed, it will be understood that my invention is not necessarily limited to such combined device, since either of these features may be employed without the other, or each may be controlled by a separate solenoid if desired.

If the feature of regulating the discharge of fluid from the brake-cylinder by the solenoid is employed by itself, it will be evident that the discharge ports will be held closed at high speed and that a high pressure may be admitted to the brake-cylinder, but as the speed diminishes and the magnetic pull of the solenoid is correspondingly reduced, the discharge ports will be opened and the brake-cylinder pressure reduced according to the diminishing speed of the vehicle. If, on the other hand a high degree of pressure is admitted to the brake-cylinder when traveling at a slow speed, the discharge valve will instantly open and permit the escape of the excess of brake-cylinder pressure. It will also be apparent that this feature of my improvement is applicable to various forms of fluid pressure brake systems in which the brakes are applied and released by admitting fluid to and discharging the same from a brake-cylinder, and that any standard or preferred type of valve mechanism may be employed for controlling the supply and release of fluid to and from the brake-cylinder.

Instead of the solenoid any other device which depends on the rotation of the wheel-axle may be employed. For example, the double piston may be connected with a centrifugal governor coupled with the wheel-axle, the force of which varies according to the velocity of rotation, so that the valve is controlled in conformity therewith.

In the braking device shown in Fig. 2 fluid pressure is employed instead of the magnetic force. The fluid is introduced into a chamber 26 of the valve 4, where it acts on the outer side of the piston 5. The fluid (either oil, glycerin, or air or the like) is forced by a pump 27 of any construction (either rotary or piston pump) driven by the wheel-axle and circulated from a vessel 28 through a pipe 29 into an air-chamber 30, where it compresses the air contained therein, whereupon it flows back into the vessel 28 through a pipe 31. A throttle-screw 32, arranged in the latter, permits of regulating the pressure in the air-chamber 30. A branch pipe 33 establishes the connection between the pipe 29 and the chamber 26. The pressure in the chamber 30 and of the fluid varies in conformity with the rotative speed of the wheels. The double piston 5, 6 has the form of a differential piston, and the pressure operating in the brake-cylinder acts on the inner side of the larger piston 5 in this construction.

Besides the inlet ports 8 a return-valve 36 is provided which permits the escape of air but not the entrance of the same. The object of this arrangement is to permit the exhaust of air from the brake-cylinder 3, when the driver's valve 22 is turned to the position shown in the drawings, even if the ports 8 are closed by the piston 6. A return-valve 36 may also be used in connection with the valve device shown in Fig. 1 for the same purpose. The spring 20 is wound around a bolt 35, attached to the piston 6, and bears with one end against a disk 34, secured to the body 4 and with the other end against the adjusting-nut 19, screwed on the bolt 35. The pressure in the brake-cylinder acts also on the inner side of the larger piston 5 and tends to displace the double piston 5, 6 to the left hand. The fluid acts on the outer side of the piston 5, and therefore tends to displace the double piston to the right. The spring 20 works on the nut 19, thus giving the double piston connected therewith by the bolt 35 an impulse to the right. These three forces displace the double piston until an equilibrium is produced, thereby regulating the passage of air into or out of the brake-cylinder in conformity with the rotative velocity of the wheel-axle, as explained with respect to Fig. 1.

In the brake apparatus shown in Figs. 3 to 5, which is adapted for use in trains having a main brake-pipe continuous through the entire length of the train, the operation of the valves is indirect in so far as the regulating valve device charges the main brake-pipe and the triple valves with pressure for taking off the brakes, while the pressure is reduced for applying the brakes and regulated in conformity with the rotative speed of the wheels.

The regulating valve device shown in Fig. 3, may be suitably arranged on the engine and connected with the wheel-axle through the chamber 26, the pump 27, and the other accessory parts for production of circulation and fluid-pressure, (shown in Fig. 2,) so that the position of the double piston depends on the speed of rotation of the wheels.

The pipe 1, connected to the main reservoir 2, continues in two branch pipes, one of which, 37, opens into the inlet-ports 8, while the other branch pipe 38, provided with the driver's brake-cock 22, is in open communication with a cap 41. The exhaust ports 7 open into the latter, in which a return valve 36 is also arranged which permits the compressed air to enter the main regulating valve but not to exhaust. A pipe 39, jointed to the sleeve 9, connects the main valve with the continuous brake-pipe 40, to which the triple valves of the several cars are connected. The fluid pressure from the pump and the air pressure from the brake pipe tend to force the double piston to the right hand, while the spring tends to displace it to the left hand.

When the brake is not in operation, the main regulating valve, the brake pipe 40, the triple valves, and the small reservoirs of the several cars are charged with pressure which is admitted from the main reservoir 2 through the driver's brake-cock 22, turned into the position shown in Fig. 3. If both ports 7 and 8 should happen to be closed by the pistons 5 and 6, respectively, the air enters the controlling-valve through the returning valve 36 and passes through the pipe 39 into the brake-pipe 40, thereby displacing the double piston 5, 6 to the right hand and opening the ports 7.

In order to set the brakes, the driver turns the cock 22 to the position shown in Fig. 4, thus permitting part of the compressed air to escape from the pipe 40 to the atmosphere through the pipe 39, ports 7, cap 41, pipe 38, and passages 24, 23, and 25. The reduction of pressure operates the triple valves in the well-known manner. At the same time the double piston 5, 6 of the main regulating valve is pushed to the left hand by the spring 20, which now predominates over the air-pressure, thereby closing the ports 7 partially or entirely. If the reduction of pressure thus obtained becomes too low without a sufficient fluid-pressure in the chamber 26, the said movement of the double piston to the left continues until the ports 8 are opened and compressed air can enter the controlling-valve through the pipe 37 and pass into the brake-pipe 40 and the triple valves, which latter are operated so as to relieve the brake-blocks from pressure. The increased air pressure then displaces the pistons 5, 6 to the right, closing both ports 7 and 8. The same effect of releasing of the brakes is produced with the decreasing velocity or with the wheels locked, so as to be prevented from rotation. Then the fluid pressure in the chamber 26 decreases, so that the force of the spring predominates over the two other forces and the pistons are displaced to the left, as above explained. On the other hand, if the driver desires to put the regulating valve out of use and to leave the brakes without automatic regulation he permits a part of the pressure to escape by turning the cock 22 into the position shown in Fig. 4, and then turns it into a position in which further exhaust is prevented, Fig. 5.

It will be obvious that the mechanism of the brake may be varied in several ways without departing from the principle of my invention. I therefore do not wish to be limited to the constructional forms shown in the drawings for examples; but

What I claim as my invention, and desire to secure by Letters Patent is:—

1. In a regulating valve for air-pressure brakes, the combination with a valve casing, having inlet and exhaust ports; of a piston-slide adapted to open and close the said ports; a spring bearing on the piston with one end and with the other end on a rigid support attached to the valve-body; a chamber provided in the valve in which the regulated air pressure reacts on the piston; and means adapted to provide a force which acts on the piston and varies according to the rotative speed of the car-wheels, substantially as described.

2. In a regulating valve for air-pressure brakes, the combination with a valve casing, having inlet and exhaust ports; of a piston slide adapted to open and close the said ports; a spring bearing on the piston with one end and on a support attached to the valve casing with the other end; a chamber in the casing in which the regulated air-pressure reacts on the piston; and a device which acts on the piston with a force varying in conformity with the rotative speed of the wheels, substantially as described.

3. A regulating valve for air-pressure brakes, consisting of a casing; inlet and exhaust ports formed therein; a by-pass closed by a return-valve; a slide adapted to open and close the said ports; a spring supported on a rest attached to the casing, which spring bears on the slide; and a chamber in the casing in which the regulated air reacts on the slide; in combination with a device connected to the wheel-axle which produces a force varying with the rotative speed and acts on the piston in such a manner that the pressure working in the brake-cylinder is automatically regulated in accordance with the rotative speed of the wheels, substantially as described.

4. An air-pressure brake, consisting of a regulating valve, having a casing with inlet and exhaust ports formed therein; a slide displaceable in the casing and adapted to open and close the said ports; a spring bearing on a support attached to the casing and acting on the slide; and a chamber in the casing in which the regulating air reacts on the slide; in combination with a device connected to the wheel-axle which produces a force varying with the rotative speed and acts on the piston in such a manner that the pressure of the brake-blocks to the wheels is automatically regulated in accordance with the rotative speed of the wheels, substantially as described.

5. A regulating valve for air-pressure brakes, consisting of a casing with inlet and exhaust ports formed therein; a slide adapted to open and close the said ports; a spring supported on the casing and bearing on the slide; and a chamber in which the regulated air reacts on the slide; in combination with a device capable of producing a force varying with the rotative speed of the wheels; all so arranged that the three forces acting on the piston in opposite directions displace the same in such a manner that the pressure of the brake-blocks onto the wheels is automatically regulated in conformity with the rotative speed of the wheels, substantially as described.

6. An air-pressure brake, consisting of a regulating valve, having a casing with inlet and exhaust ports formed therein; a slide adapted to open and close the said ports; a spring supported on the casing and bearing on the said slide; and a chamber in which the regulated air reacts on the slide; in combination with a device capable of producing a force which varies with the rotative speed of the wheels, whereby the said force together with the forces produced by the spring and the regulated air act on the slide in such a manner that the pressure working in the brake-cylinder is automatically regulated in accordance with the rotative speed of the wheels, substantially as described.

7. In a regulating valve for air-pressure brakes, the combination with a valve casing, having inlet and exhaust ports; of a regulating slide adapted to open and close the said ports; a spring bearing on the piston with one end and with the other end on a rigid support attached to the valve-body; means which allow the regulated air to act on the piston; and means adapted to produce a force which acts on the piston and varies according to the rotative speed of the car-wheels, substantially as described.

8. In a regulating valve for air-pressure brakes, the combination with a valve casing, having inlet and exhaust ports; of a slide adapted to open and close the said ports; a spring bearing with its one end on the piston and with its other end on a support attached to the valve casing, means for regulating the tension of the spring; means which allow the regulated air to act on the piston; and a device which acts on the piston with a force varying in conformity with the rotative speed of the wheels, substantially as described.

9. In a fluid pressure brake, the combination with an electro-magnetic device for controlling the brake-cylinder pressure, of an electric generator driven by the momentum of the vehicle for varying the supply of current to the electro-magnetic device according to the speed of the vehicle.

10. In a fluid pressure brake, the combination with a valve device for governing the brake-cylinder pressure, and electro-magnetic means for controlling said device, of an electric generator driven from the axle of the vehicle for varying the supply of current to said electro-magnetic means according to the speed.

11. In a fluid pressure brake, the combination with a valve device for governing a brake-cylinder discharge, of an electric generator driven from the axle of the vehicle, and means operated by the varying current thus generated for controlling said valve device, according to the speed.

12. In a fluid pressure brake, the combination with a brake-cylinder, and an electro-magnetic device for controlling the pressure therein, of an electric generator driven by the momentum of the vehicle for varying the supply of current to the electro-magnetic device according to the speed.

13. In a fluid pressure brake, the combination with a brake-cylinder, and an electro-magnetic device for controlling the pressure therein, of a momentum-driven electric generator for supplying current to said electro-magnetic device, according to the speed.

14. In a fluid pressure brake, the combination with a valve device for governing the supply of air to and its discharge from a brake-cylinder, and electro-magnetic means for controlling said valve device, of an electric generator driven by the momentum of the vehicle for supplying current to said electro-magnetic device according to the speed.

In testimony whereof I have signed my name hereunto in presence of two witnesses.

ERWIN KRAMER.

Witnesses:
HENRY HASPER,
WOLDEMAR HAUPT.